March 11, 1947.   H. RUTISHAUSER   2,417,270
VALVE
Filed Aug. 23, 1944
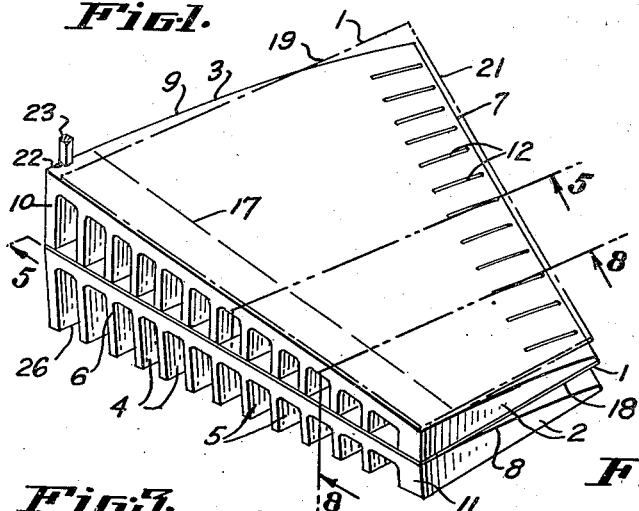
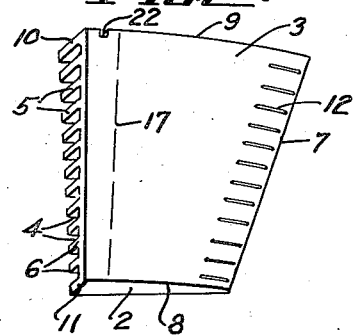
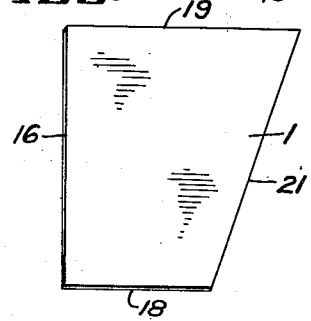
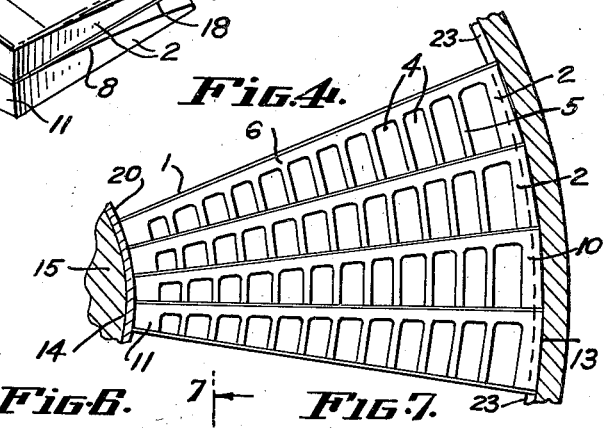
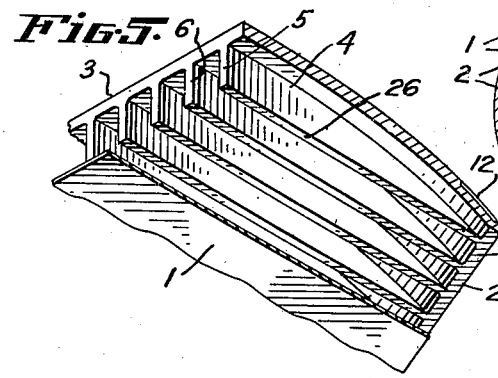
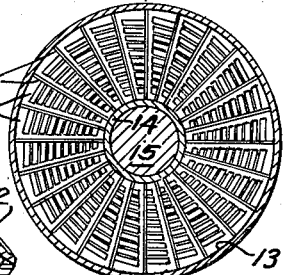
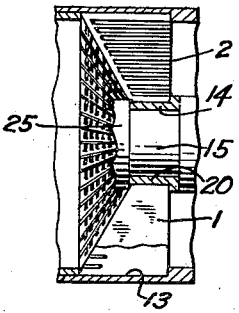
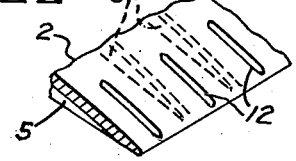
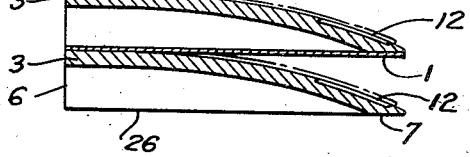
INVENTOR.
HANS RUTISHAUSER
BY
Christie & Angus
ATTORNEYS.

Patented Mar. 11, 1947

2,417,270

UNITED STATES PATENT OFFICE 2,417,270

VALVE

Hans Rutishauser, Altadena, Calif., assignor to Aerojet Engineering Corporation, Azusa, Calif., a corporation of Delaware Application August 23, 1944, Serial No. 550,695

6 Claims. (Cl. 277—46)

This invention relates to valves and more particularly to automatic valves.

The invention provides a valve means capable of rapidly and automatically responding to slight pressure differentials acting on the fluid on either side of the valve.

The invention also provides a valve means that does not employ any complicated moving parts and requires little upkeep.

In general my valve means will permit a fluid to pass through the valve system as long as the pressure at the discharge side is slightly less than the pressure at the entry side. When the pressure at the discharge side is equal or greater than the entry pressure, the valve will remain closed and no fluid will flow.

In accordance with a feature of my invention the valve is adapted to be placed in a fluid flow conduit, the valve members radiating from a central or interior location in the conduit.

A related feature is the provision of such radiating flow channel members having flow channels which progressively increase in size toward the wall of the channel. Another related feature which may be embodied is the provision of valve members which are substantially trapezoidally-shaped.

The valve according to my invention is useful in controlling the flow of fluids in some jet propulsion motors, for example, in motors adapted to operate through water or air in which either the air or water medium in which it operates is drawn in through an entrance opening to a chamber in the interior of the motor through the valve.

These features of my ivention will be more fully understood from the following detailed description and accompanying drawing in which:

Fig. 1 is a perspective view of a part of the valve assembly;

Fig. 2 is a perspective drawing of a valve body;

Fig. 3 is a perspective drawing of a valve blade;

Fig. 4 is a partial view partly in cross section taken at the entrance side of the valve;

Fig. 5 is a broken detail view partly in cross section taken on line 5—5 of Fig. 1 showing valve body construction;

Fig. 6 is a front view of the complete valve assembly;

Fig. 7 is a side view of the valve assembly and mounting partly in cross section taken on line 7—7 of Fig. 6;

Fig. 8 is a detail view, partly in cross section taken at line 8—8 of Fig. 1; and Fig. 9 is a fragmentary view showing a detail of construction of the valve body of Figs. 1 and 2.

This valve is built up of an assembly of flexible blades 1 and rigid channel members 2 as illustrated by Figs. 3 and 2 respectively. Each rigid channel member 2 comprises a trapezoidal-shaped plate 3, the upper face of which is provided with a curvature as shown in Fig. 2. The lower surface of plate 3 is provided with a number of channels 4 formed by channel members 5 which are integral with the plate and run parallel with each other as shown. These channel members 5 taper in depth being deeper at the leading edge 6 and tapering at the rear edge 7 to coincide with the thickness of the rear edge of the plate. Furthermore, the successive channel members 5 increase uniformly in depth from one to the next from the inner edge 8 of member 2 toward the longer edge 9. Thus, the outer channel strip 10 is considerably thicker than the innermost channel strip 11 although all channel strips 5 taper to the rear edge 7 of member 2. The upper surface of member 2 is provided with a number of parallel grooves 12 corresponding with the number of channels and positioned to be centered with reference to the respective channels. Each channel member 2 is dimensioned so that its shorter edge 8 is adapted to be aligned longitudinally with the outer shell 14 of the center piece 15, and its outer edge 9 is adapted to be coextensive longitudinally of inner surface of cylindrical shell 13. Each of the flexible blade plates 1 is of trapezoidal-shape as shown in Fig. 3 in correspondence with the shape of channel member 2.

Fig. 1 is a perspective view illustrating a flexible blade 1 sandwiched between two adjacent channel members 2. Fig. 5 is taken on line 5—5 of Fig. 1 looking up underneath the channel member 2 and showing part of a valve blade 1.

The curvature of face 3 of each channel member is such that the rear edge 7 of each channel comes down and meets the rear edge 21 of the corresponding adjacent valve blade 1 as more clearly shown in Fig. 8. The arrangement is such that the lower edge 26 of all channel partitions 5 of each channel member is flat against the flat surface of blade member 1 as illustrated in Fig. 8.

By this assembly arrangement the rear edges 21 of flexible blades 1 are enabled to vibrate so as alternately to contact and move away from the rear edge 7 of the member 2. This creates the valve action as the valve is closed when blade 1 is against member 2. The grooves 12 keep the valve blade from sticking in the open position.

When the valve assembly is complete the several flexible blades 1 are alternately interleaved between the several channel members 2 and are firmly held near their leading edges 16 between channel strips 5 of one channel member and the front flat face 17 of the next.

This assembly arrangement is more clearly shown in Figs. 1, 4, 6, 7 and 8. Fig. 6 shows that the alternate channel member 2 and flexible blades 1 are stacked all around the annular space between the central support 15 and outer shell 13. The short edges 18 and 8 of blades 1 and channel members 2 extend longitudinally along a collar 20 mounted on central support 15 and the long edges 19 and 9 extend longitudinally along shell 13. For convenience only a segment of this annular valve assembly is shown in Fig. 4.

To hold the valves in position on collar 20 matching grooves 22 may be cut into the outer edge of valve element 2 and a split compression ring 23 is slipped into the annular space thus formed. After all valve blades and elements have been mounted on collar 20, the valve blade assembly is slipped in position on reduced diameter 14 and locked in place when the succeeding section 25 is screwed in place onto the central support 15. From the front the valve assembly resembles a circular honeycomb as shown by Figs. 4 and 6.

In accordance with my invention I have provided a sensitive valve arrangement which is well adapted for insertion in a fluid flow conduit, and particularly a circular conduit for automatic regulation of the flow in accordance with the pressure on either side of the valve. The construction of my preferred embodiment described above is well suited for use in circular conduits as provision is made for adapting the valve elements to the circular cross section, by reason of their radial positions. The trapezoidal-shape of the valve elements, moreover, is especially well suited for facilitating the sensitive operation of the valve members in spite of the fact that the flow channels vary in depth progressively from the center. Thus, by reason of this shape the valve members are enabled to close and open uniformly throughout their entire line of valve action so that the flow through all the channels is stopped and started at the same time.

When the pressure on the fluid at the discharge side of the valve is greater or equal to the pressure acting on the fluid at the entrance, the valve bank will remain closed thereby preventing the flow of fluid. As soon as the pressure on the discharge side is less than that acting on the entry side of the valves the flexible blades will be depressed and permit the fluid to pass through the valve assembly.

The degree of flexibility required is dependent on the particular operation. The flexibility may be varied by selecting the proper thickness and material of which the blade is to be made. It is evident that the valve assembly of my invention may be designed to respond to either high or low pressure differentials and provide an effective automatic valve means which does not require complicated moving parts and which can be easily repaired and assembled.

I claim:

1. An automatically operable valve having a central support and a substantially circular outer periphery adapted to be fitted in a circular fluid flow conduit, said valve comprising a plurality of flexible blades interleaved between rigid plates, said blades lying substantially in the direction of fluid flow, the rigid plates being provided with channel members to form channels which progressively increase in depth at the leading edge as they progress from the central support of the assembly toward the periphery, said channels being formed in the direction of fluid flow and said flexible blades being rigidly held at their forward edges against the channel members to form a side of the channels, the depth of the channels tapering to zero depth in the direction of fluid flow, so that the blades are adapted to rest against the rear edges of the channel members to close the valve and to be flexibly moved away from said rear edges by pressure on the plates to open the valve.

2. An automatically operable valve according to claim 1 in which each of the blade members and each of the rigid plates is substantially trapezoidal in shape having the two sides adjacent to the leading edge perpendicular thereto, and having the side at the periphery longer than the side at the central support, thereby making the channels of greater length as they progress from the center to the outside.

3. An automatically operable valve according to claim 1 in which each of the blade members and each of the rigid plates is substantially trapezoidal in shape having the two sides adjacent the leading edge perpendicular to said leading edge the shorter or inner edges of said blades and said channeled plates being mounted on an assembly ring and said blades and said channeled plates being held together at the longer or outside edges by a split ring fitting into annular slotted grooves cut in the longer or outside edges of said channeled plates.

4. An automatically operable valve according to claim 1 in which the faces of the channeled plates on the sides opposite the channel members are grooved, said grooves starting at the discharge or rear edges of the plates and progressing a short distance in a direction substantially parallel to the channel members and being centered between the latter.

5. An automatically operable valve having a central support and an outer periphery adapted to be fitted in a fluid flow conduit, said valve comprising a plurality of flexible blades interleaved between rigid plates, the blades and the plates being arranged radially around the central support, said blades lying substantially in the direction of fluid flow, the rigid plates being provided with ribs arranged so that the blades lie against the ribs, forming channels between the ribs, the channels increasing progressively in depth at the leading edge as they progress from the central support of the assembly toward the periphery, said channels being formed in the direction of fluid flow and said flexible blades being rigidly held at their forward edges against the channel ribs and adapted to rest against the rear edges of the channel ribs to close the valve and being adapted to be flexibly moved away from said rear edges to open the valve.

6. A valve according to claim 5 in which each of the blade members and each of the rigid plates is substantially trapezoidal in shape, the longer of the parallel sides adjacent the leading edge being substantially perpendicular thereto, the longer of the last-mentioned sides being at the periphery and the shorter being at the central support.

HANS RUTISHAUSER.

REFERENCES CITED

The following references are of record in the file of this patent:

UNITED STATES PATENTS

| Number | Name | Date |
|---|---|---|
| 1,229,457 | Hildebrand | June 12, 1917 |
| 247,857 | Thompson | Oct. 4, 1881 |
| 181,295 | Weimer | Aug. 22, 1876 |
| 2,302,447 | King | Nov. 17, 1942 |
| 2,199,307 | Eichelberg | Apr. 30, 1940 |

FOREIGN PATENTS

| Number | Country | Date |
|---|---|---|
| 512,632 | Britain | Sept. 21, 1939 |